(12) United States Patent
Kalyanasundharam et al.

(10) Patent No.: US 10,705,959 B2
(45) Date of Patent: Jul. 7, 2020

(54) REGION BASED SPLIT-DIRECTORY SCHEME TO ADAPT TO LARGE CACHE SIZES

(71) Applicant: Advanced Micro Devices, Inc., Santa Clara, CA (US)

(72) Inventors: Vydhyanathan Kalyanasundharam, San Jose, CA (US); Kevin M. Lepak, Austin, TX (US); Amit P. Apte, Austin, TX (US); Ganesh Balakrishnan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/119,438

(22) Filed: Aug. 31, 2018

(65) Prior Publication Data
US 2020/0073801 A1 Mar. 5, 2020

(51) Int. Cl.
*G06F 12/0817* (2016.01)

(52) U.S. Cl.
CPC ...... *G06F 12/082* (2013.01); *G06F 2212/622* (2013.01)

(58) Field of Classification Search
CPC .................................................. G06F 12/082
See application file for complete search history.

(56) References Cited

U.S. PATENT DOCUMENTS

| | | |
|---|---|---|
| 5,463,753 A | 10/1995 | Fry et al. |
| 6,101,581 A | 8/2000 | Doren et al. |
| 6,295,598 B1 * | 9/2001 | Bertoni ............... G06F 12/0826 711/E12.031 |
| 6,754,782 B2 * | 6/2004 | Arimilli ............. G06F 12/0817 711/119 |
| 6,810,467 B1 | 10/2004 | Khare et al. |
| 6,826,651 B2 | 11/2004 | Michael et al. |
| 6,868,481 B1 | 3/2005 | Gaither et al. |

(Continued)

OTHER PUBLICATIONS

International Search Report and Written Opinion in International Application No. PCT/US2018/051765, dated Nov. 26, 2018, 12 pages.

(Continued)

*Primary Examiner* — Edward J Dudek, Jr.
(74) *Attorney, Agent, or Firm* — Kowert Hood Munyon Rankin and Goetzel PC; Rory D. Rankin

(57) ABSTRACT

Systems, apparatuses, and methods for maintaining region-based cache directories split between node and memory are disclosed. The system with multiple processing nodes includes cache directories split between the nodes and memory to help manage cache coherency among the nodes' cache subsystems. In order to reduce the number of entries in the cache directories, the cache directories track coherency on a region basis rather than on a cache line basis, wherein a region includes multiple cache lines. Each processing node includes a node-based cache directory to track regions which have at least one cache line cached in any cache subsystem in the node. The node-based cache directory includes a reference count field in each entry to track the aggregate number of cache lines that are cached per region. The memory-based cache directory includes entries for regions which have an entry stored in any node-based cache directory of the system.

19 Claims, 10 Drawing Sheets

(56) References Cited

U.S. PATENT DOCUMENTS

| | | |
|---|---|---|
| 6,868,485 B1 | 3/2005 | Conway |
| 6,922,755 B1 | 7/2005 | Safranek et al. |
| 6,973,543 B1 | 12/2005 | Hughes |
| 7,206,934 B2 | 4/2007 | Pabla et al. |
| 7,523,327 B2 | 4/2009 | Cline et al. |
| 7,797,495 B1 | 9/2010 | Lepak |
| 2002/0038407 A1 | 3/2002 | Mounes-Toussi et al. |
| 2002/0083274 A1 | 6/2002 | Gharachorloo et al. |
| 2003/0093621 A1 | 5/2003 | Desota et al. |
| 2003/0154345 A1 | 8/2003 | Lyon |
| 2003/0217234 A1 | 11/2003 | Rowlands |
| 2004/0088496 A1 | 5/2004 | Glasco et al. |
| 2004/0268061 A1 | 12/2004 | Khare et al. |
| 2005/0154831 A1 | 7/2005 | Steely et al. |
| 2005/0160240 A1 | 7/2005 | Van Doren et al. |
| 2005/0251626 A1 | 11/2005 | Glasco |
| 2007/0055826 A1 | 3/2007 | Morton et al. |
| 2007/0156972 A1 | 7/2007 | Uehara et al. |
| 2008/0086601 A1* | 4/2008 | Gaither .............. G06F 12/0824 711/141 |
| 2008/0244134 A1* | 10/2008 | Hosomi .............. G06F 12/0808 710/200 |
| 2009/0249318 A1* | 10/2009 | Ayguade .............. G06F 8/4442 717/151 |
| 2010/0005245 A1 | 1/2010 | Beers et al. |
| 2012/0210068 A1 | 8/2012 | Joshi et al. |
| 2013/0097385 A1 | 4/2013 | Beckmann et al. |
| 2013/0290643 A1 | 10/2013 | Lim et al. |
| 2014/0032848 A1 | 1/2014 | Zhao et al. |
| 2014/0379997 A1 | 12/2014 | Blaner et al. |
| 2015/0058570 A1* | 2/2015 | Wang .................. G06F 12/0804 711/122 |
| 2015/0242318 A1* | 8/2015 | Bernard ................ G06F 12/084 711/130 |
| 2016/0357671 A1* | 12/2016 | Kuskin .............. G06F 12/0891 |
| 2019/0188137 A1 | 6/2019 | Kalyanasundharam et al. |

OTHER PUBLICATIONS

Martin et al., "Using Destination—Set Prediction to Improve the Latency/Bandwidth Tradeoff in Shared-Memory Multiprocessors", Proceedings of the 30th Annual Symposium on Computer Architecture, Jun. 9, 2003, pp. 206-217.

* cited by examiner

REGION BASED SPLIT-DIRECTORY SCHEME TO ADAPT TO LARGE CACHE SIZES

BACKGROUND

Description of the Related Art

Computer systems use main memory that is typically formed with inexpensive and high density dynamic random access memory (DRAM) chips. However DRAM chips suffer from relatively long access times. To improve performance, data processors typically include at least one local, high-speed memory known as a cache. In a multi-core data processor, each data processor core can have its own dedicated level one (L1) cache, while other caches (e.g., level two (L2), level three (L3)) are shared by data processor cores.

Cache subsystems in a computing system include high-speed cache memories which store blocks of data. As used herein, a "block" is a set of bytes stored in contiguous memory locations, which are treated as a unit for coherency purposes. As used herein, each of the terms "cache block", "block", "cache line", and "line" is interchangeable. In some implementations, a block can also be the unit of allocation and deallocation in a cache. The number of bytes in a block is varied according to design choice.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Cache directories are a key building block in high performance scalable systems. A cache directory is used to keep track of the cache lines that are currently in use by the system. A cache directory improves both memory bandwidth as well as reducing probe bandwidth by performing a memory request or probe request only when required. Logically, the cache directory resides at the home node of a cache line which enforces the cache coherence protocol. The operating principle of a cache directory is inclusivity (i.e., a line that is present in a central processing unit (CPU) cache must be present in the cache directory). In a cache line based directory scheme, each cache line is tracked individually. So, the size of the cache directory has to increase linearly with the total capacity of all of the CPU cache subsystems in the computing system. The total CPU cache size tends to grow exponentially as memory technology improves. Accordingly, a line-based cache directory scheme is not able to keep up with the exponential growth of the CPU cache size.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for maintaining a region-based cache directories split between processing node and memory are disclosed. A system includes multiple processing nodes, with each processing node including a cache subsystem. The system also includes cache directories split between the nodes and memory to help manage cache coherency among the different cache subsystems of the system. In order to reduce the number of entries in the cache directories, the cache directories tracks coherency on a region basis rather than on a cache line basis, wherein a region includes multiple cache lines. Each processing node includes a node-based cache directory to track regions which have at least one cache line cached in any cache subsystem in the node. The node-based cache directory includes a reference count in each entry to track the aggregate number of cache lines (within the node) that are cached per region. If a reference count of a given entry goes to zero, the node-based cache directory reclaims the given entry and sends a corresponding notification to the memory-based cache directory. The memory-based cache directory includes entries for any regions which have entries stored in any node-based cache directory of the system. In other words, the memory-based cache directory is inclusive of the node-based cache directories. Each entry in the memory-based cache directory includes a node-valid field to indicate which nodes have an entry for the corresponding region. Maintaining region-based cache directories split between processing node and memory filters out a lot of victim modifications that would normally be generated in the case when there is only a monolithic memory-based cache directory.

Figure 1:
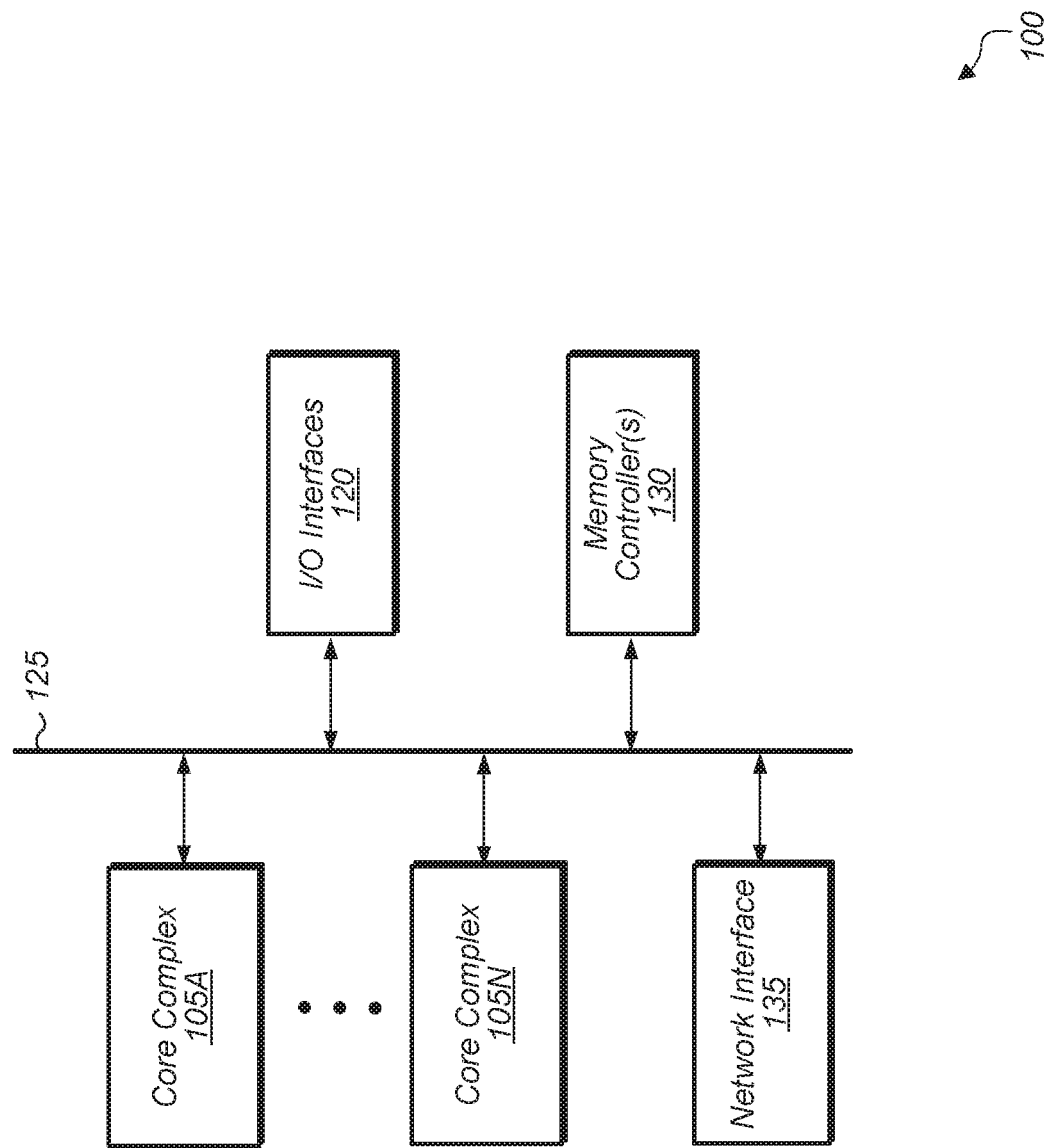
FIG. 1 is a block diagram of one implementation of a computing system.

Referring now to FIG. 1, a block diagram of one implementation of a computing system 100 is shown. In one implementation, computing system 100 includes at least core complexes 105A-N, input/output (I/O) interfaces 120, bus 125, memory controller(s) 130, and network interface 135. In other implementations, computing system 100 includes other components and/or computing system 100 is arranged differently. In one implementation, each core complex 105A-N includes one or more general purpose processors, such as central processing units (CPUs). It is noted that a "core complex" can also be referred to as a "processing node" or a "CPU" herein. In some implementations, one or more core complexes 105A-N include a data parallel processor with a highly parallel architecture. Examples of data parallel processors include graphics processing units (GPUs), digital signal processors (DSPs), field programmable gate arrays (FPGAs), application specific integrated circuits (ASICs), and so forth. Each processor core within core complex 105A-N includes a cache subsystem with one or more levels of caches. In one implementation, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a server, computer, laptop, mobile device, game console, streaming device, wearable device, or any of various other types of computing systems or devices. It is noted that the number of components of computing system 100 varies from implementation to implementation. In other implementations, there are more or fewer of each component than the number shown in FIG. 1. It is also noted that in other implementations, computing system 100 includes other components not shown in FIG. 1 and/or is structured in other ways.

Figure 2:
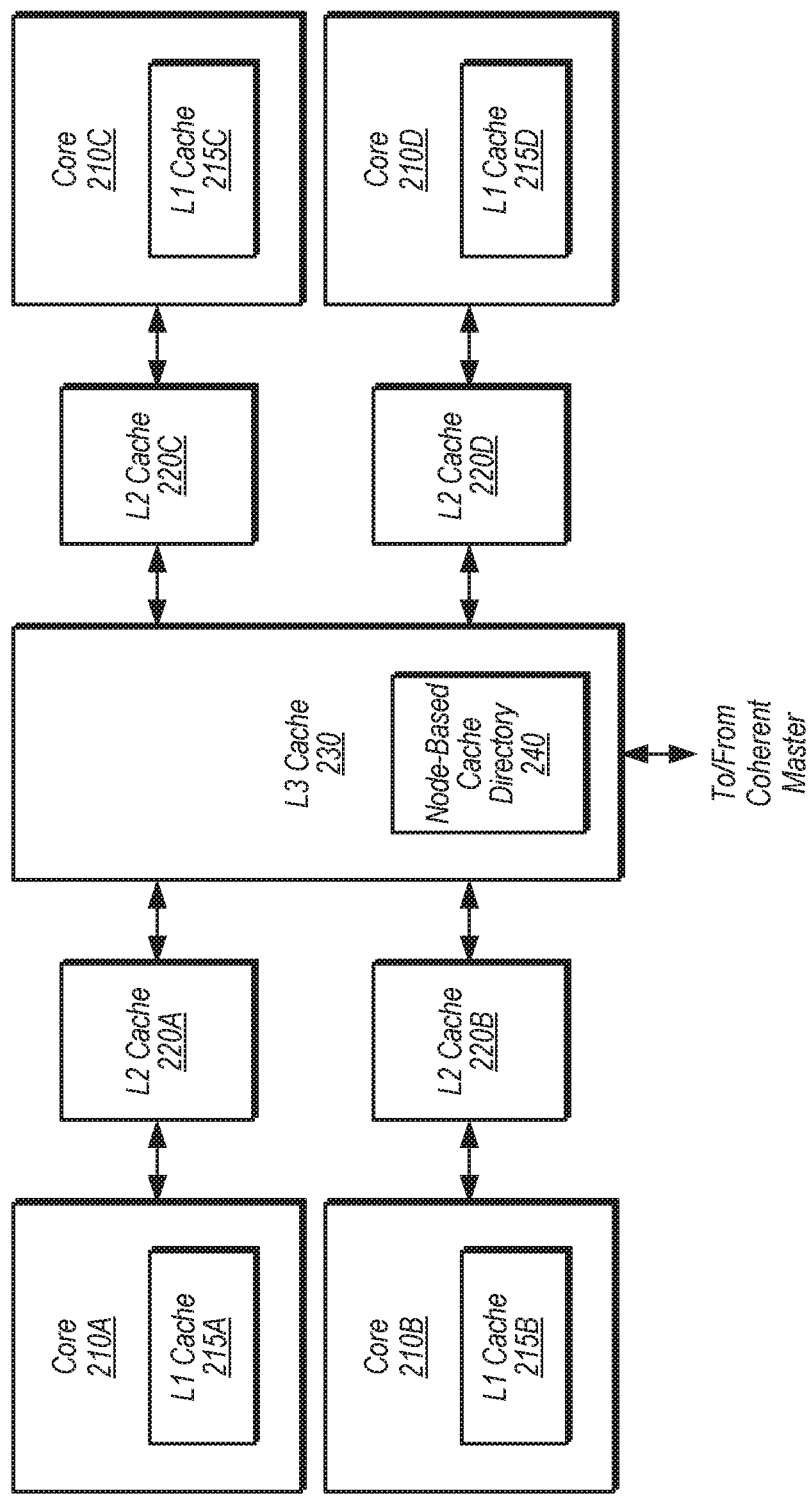
FIG. 2 is a block diagram of one implementation of a core complex.

Turning now to FIG. 2, a block diagram of one implementation of a core complex 200 is shown. In one implementation, core complex 200 includes four processor cores 210A-D. In other implementations, core complex 200 includes other numbers of processor cores. It is noted that a "core complex" can also be referred to as a "processing node" or "CPU" herein. In one implementation, the components of core complex 200 are included within core complexes 105A-N (of FIG. 1).

Each processor core 210A-D includes a cache subsystem for storing data and instructions retrieved from the memory subsystem (not shown). For example, in one implementation, each core 210A-D includes a corresponding level one (L1) cache 215A-D. In one implementation, each processor core 210A-D includes or is coupled to a corresponding level two (L2) cache 220A-D. Additionally, in one implementation, core complex 200 includes a level three (L3) cache 230 which is shared by the processor cores 210A-D. In this implementation, L3 cache 230 is coupled to a coherent master for access to the fabric and memory subsystem. It is noted that in other implementations, core complex 200 includes other types of cache subsystems with other numbers of caches and/or with other configurations of the different cache levels.

In one implementation, node-based cache directory 240 is stored within L3 cache 230. In another implementation, node-based cache directory 240 is stored in a coherent master (not shown) coupled to core complex 200. In other implementations, node-based cache directory 240 is stored in other locations within core complex 200 or external to core complex 200. It is noted that a "node-based cache directory" is also referred to as a "CPU-based cache directory" herein.

CPU cache directory 240 tracks regions that have at least one cache line accessed by any of the cores 210A-D of core complex 200. When a cache line of a given region is allocated in L1 caches 215A-D, a lookup is performed of CPU cache directory 240 for the given region. If an entry is already allocated in CPU cache directory 240 for the given region, then a reference count of the matching entry is incremented. If the lookup of CPU cache directory 240 is a miss for the given region, then a new entry is allocated for the given region. Typically, an existing entry is deallocated to make room for the new entry. When an existing entry is evicted, a notification of the eviction is sent to a memory-based cache directory (not shown) which tracks the memory address range of the given region. In one implementation, the memory-based cache directory includes a vector for each entry, and the vector indicates which core complexes have accessed a cache line within the corresponding region. In this implementation, the memory-based cache directory will clear out the bit for that particular core complex in the given region's entry in response to receiving the notification of the eviction. If all bits in the bit vector for the given region's entry are now cleared, the entry can be deallocated from the memory-based cache directory.

If a given cache line in L1 caches 215A-D or L2 caches 220A-D is evicted or invalidated by a coherency probe, then the corresponding entry in node-based cache directory 240 is located, and the reference count for this entry is decremented. If the reference count for the entry goes to zero, then this entry is marked as invalid and can be reclaimed. Also, when the reference count for an entry goes to zero, a notification is sent to the memory-based cache directory. In response to receiving this message, a corresponding entry in the memory cache directory is invalidated.

Figure 3:
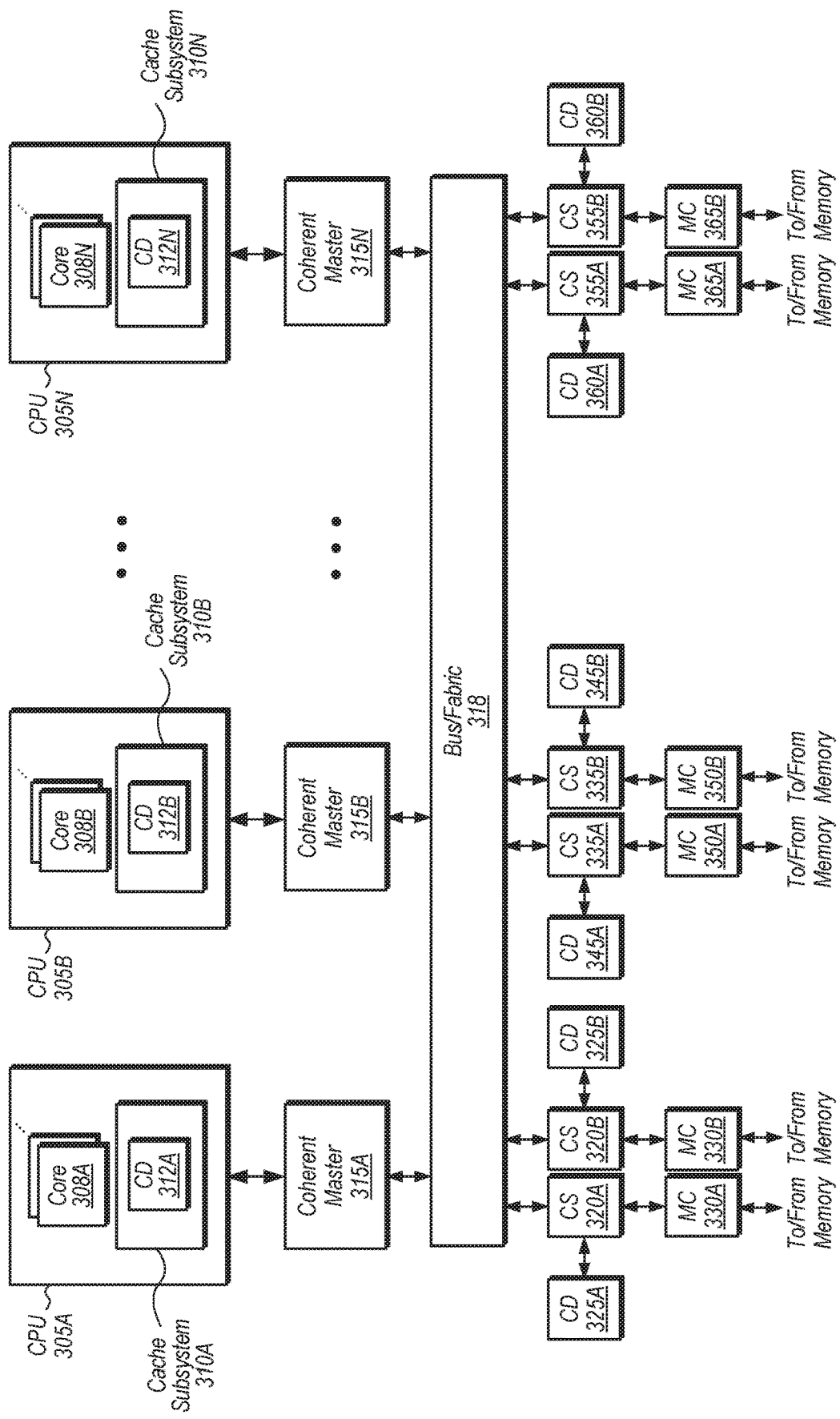
FIG. 3 is a block diagram of one implementation of a multi-CPU system.

Referring now to FIG. 3, a block diagram of one implementation of a multi-CPU system 300 is shown. In one implementation, system includes multiple CPUs 305A-N. The number of CPUs per system varies from implementation to implementation. Each CPU 305A-N includes any number of cores 308A-N, respectively, with the number of cores varying according to the implementation. Each CPU 305A-N also includes a corresponding cache subsystem 310A-N. Each cache subsystem 310A-N includes any number of levels of caches and any type of cache hierarchy structure.

In one implementation, each cache subsystem 310A-N includes a corresponding CPU-based cache directory 312A-N, respectively. In this implementation, the cache directory is split into the CPU-based cache directories 312A-N and memory-based cache directories 325A-B, 345A-B, and 360A-B. Each CPU-based cache directory 312A-N tracks regions which have at least one cache line that is cached by a corresponding CPU 305A-N. In one implementation, each CPU-based cache directory 312A-N is stored within a respective cache subsystem 310A-N. The entries in each CPU-based cache directory 312A-N include a reference count to track the number of cache lines of a corresponding region that are cached by CPUs 305A-N, respectively. As cache lines are allocated, evicted, or invalidated by CPUs 305A-N for a given region, updates are made to the corresponding CPU-based cache directories 312A-N, respectively. Only when an entry is allocated or evicted from a CPU-based cache directory is a notification sent to the corresponding memory-based cache directory 325A-B, 345A-B, and 360A-B. This reduces the amount of traffic sent to the memory-based cache directories and reduces the updates that are made to the memory-based cache directories 325A-B, 345A-B, and 360A-B.

In one implementation, each CPU 305A-N is connected to a corresponding coherent master 315A-N. In another implementation, the CPU-based cache directories 312A-N are stored in coherent masters 315A-N, respectively, rather than being stored in the cache hierarchy of respective CPUs 305A-N. As used herein, a "coherent master" is defined as an agent that processes traffic flowing over an interconnect (e.g., bus/fabric 318) and manages coherency for a connected CPU. To manage coherency, a coherent master receives and processes coherency-related messages and probes, and the coherent master generates coherency-related requests and probes. It is noted that a "coherent master" can also be referred to as a "coherent master unit" herein.

In one implementation, each CPU 305A-N is coupled to a pair of coherent slaves via a corresponding coherent master 315A-N and bus/fabric 318. For example, CPU 305A is coupled through coherent master 315A and bus/fabric 318 to coherent slaves 320A-B. In other implementations, bus/fabric 318 includes connections to other components which are not shown to avoid obscuring the figure. For example, in another implementation, bus/fabric 318 includes connections to one or more I/O interfaces and one or more I/O devices.

Coherent slave (CS) 320A is coupled to memory controller (MC) 330A and coherent slave 320B is coupled to memory controller 330B. Coherent slave 320A is coupled to memory-based cache directory (CD) 325A, with memory-based cache directory 325A including entries for memory regions that have cache lines cached in system 300 for the memory accessible through memory controller 330A. It is noted that memory-based cache directory 325A, and each of the other CPU-based and memory-based cache directories, can also be referred to as a "probe filter". Coherent slave 320B is coupled to memory-based cache directory 325B, with memory-based cache directory 325B including entries for memory regions that have cache lines cached in system 300 for the memory accessible through memory controller 330B. It is noted that the example of having two memory controllers per CPU is merely indicative of one implementation. It should be understood that in other implementations, each CPU 305A-N can be connected to other numbers of memory controllers besides two.

In a similar configuration to that of CPU 305A, CPU 305B is coupled to coherent slaves 335A-B via coherent master 315B and bus/fabric 318. Coherent slave 335A is coupled to memory via memory controller 350A, and coherent slave 335A is also coupled to memory-based cache directory 345A to manage the coherency of cache lines corresponding to memory accessible through memory controller 350A. Coherent slave 335B is coupled to memory-based cache directory 345B and coherent slave 335B is coupled to memory via memory controller 365B. Also, CPU 305N is coupled to coherent slaves 355A-B via coherent master 315N and bus/fabric 318. Coherent slaves 355A-B are coupled to memory-based cache directory 360A-B, respectively, and coherent slaves 355A-B are coupled to memory via memory controllers 365A-B, respectively. As used herein, a "coherent slave" is defined as an agent that manages coherency by processing received requests and probes that target a corresponding memory controller. It is noted that a "coherent slave" can also be referred to as a "coherent slave unit" herein. Additionally, as used herein, a "probe" is defined as a message passed from a coherency point to one or more caches in the computer system to determine if the caches have a copy of a block of data and optionally to indicate the state into which the cache should place the block of data.

When a coherent slave receives a memory request targeting its corresponding memory controller, the coherent slave performs a lookup to its corresponding memory-based cache directory to determine if the request targets a region which has at least one cache line cached in any of the cache subsystems. In one implementation, each memory-based cache directory and CPU-based cache directory in system 300 tracks regions of memory, wherein a region includes a plurality of cache lines. The size of the region being tracked can vary from implementation to implementation. By tracking at a granularity of a region rather than at a finer granularity of a cache line, the size of each memory-based and CPU-based cache directory is reduced. It is noted that a "region" can also be referred to as a "page" herein. When a request is received by a coherent slave, the coherent slave determines the region which is targeted by the request. Then a lookup is performed of the memory-based cache directory for this region. If the lookup results in a hit, then the coherent slave sends a probe to the CPU(s) which are identified in the hit entry. The type of probe that is generated by the coherent slave depends on the coherency state specified by the hit entry.

Figure 4:
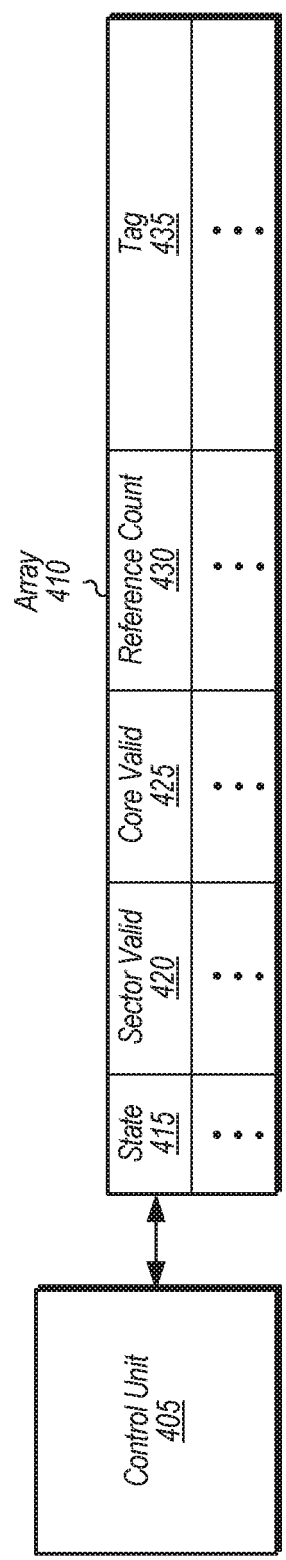
FIG. 4 is a block diagram of one implementation of a CPU-based cache directory.

Turning now to FIG. 4, a block diagram of one implementation of a CPU-based cache directory 400 is shown. In one implementation, CPU-based cache directories 312A-N (of FIG. 3) include the functionality shown in CPU-based cache directory 400. It is noted that a "CPU-based cache directory" is also referred to as a "node-based cache directory" herein. In one implementation, CPU cache directory 400 includes control unit 405 and array 410. Array 410 includes any number of entries, with the number of entries varying according to the implementation. In one implementation, each entry of array 410 includes a state field 415, sector valid field 420, core valid field 425, reference count field 430, and tag field 435. In other implementations, the entries of array 410 include other fields and/or are arranged in other suitable manners.

The state field 415 includes state bits that specify the aggregate state of the region. In one implementation, the aggregate state is a reflection of the most restrictive cache line state for this particular region. For example, the state for a given region is stored as "dirty" even if only a single cache line for the entire given region is dirty. Also, the state for a given region is stored as "shared" even if only a single cache line of the entire given region is shared.

The sector valid field 420 stores a bit vector corresponding to sub-groups or sectors of lines within the region to provide fine grained tracking. The organization of sub-groups and the number of bits in sector valid field 420 vary according to the implementation. In one implementation, two lines are tracked within a particular region entry using sector valid field 420. In another implementation, other numbers of lines are tracked within each region entry. In this implementation, sector valid field 420 is used to indicate the number of partitions that are being individually tracked within the region. Additionally, the partitions are identified using offsets which are stored in sector valid field 420. Each offset identifies the location of the given partition within the given region. Sector valid field 420, or another field of the entry, also indicates separate owners and separate states for each partition within the given region. The core valid field 425 includes a bit vector to track the presence of the region across various cores within the local CPU. For example, in one implementation, each CPU includes a plurality of processor cores.

The reference count field 430 is used to track the number of cache lines of the region which are cached somewhere in the local CPU. On the first access to a region, an entry is installed in table 410 and the reference count field 430 is set to one. Each time a cache from the local CPU accesses a cache line from this region, the reference count is incremented. These accesses only require updating the reference count, and a notification to the memory-based cache directory does not need to be sent. This helps to reduce the amount of probe traffic sent on the fabric. As cache lines from this region get evicted by the caches of the local CPU or invalidated by a coherency probe, the reference count decrements. Eventually, if the reference count reaches zero, the entry is marked as invalid and the entry can be reused for another region. By utilizing the reference count field 430, the incidence of region invalidation probes can be reduced. The reference count field 430 allows directory entries to be reclaimed when an entry is associated with a region with no active subscribers. In one implementation, the reference count field 430 can saturate once the reference count crosses a threshold. The threshold can be set to a value large enough to handle private access patterns while sacrificing some accuracy when handling widely shared access patterns for communication data. The tag field 435 includes the tag bits that are used to identify the entry associated with a particular region.

Figure 5:
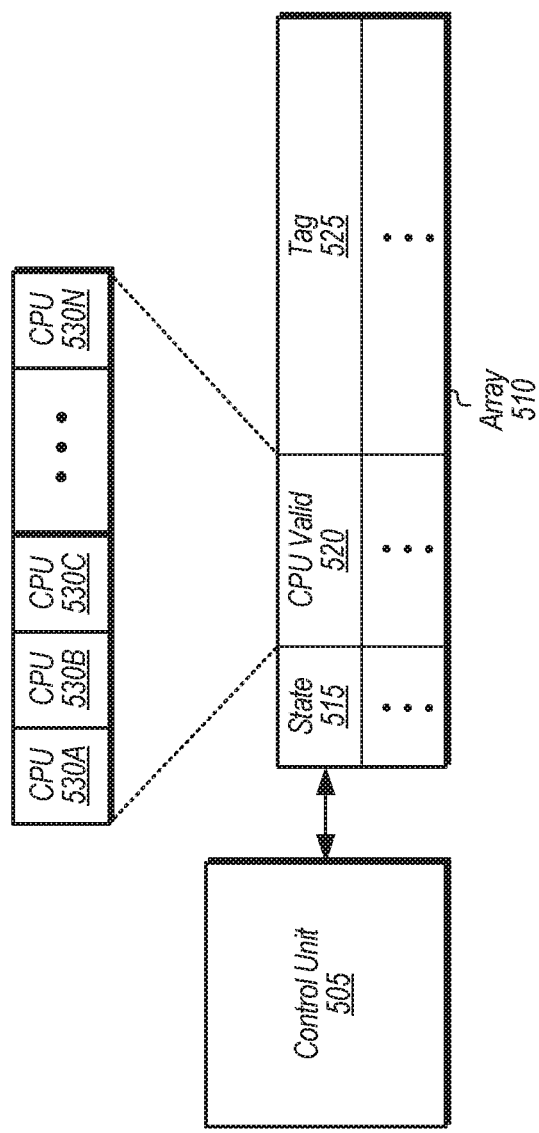
FIG. 5 is a block diagram of one implementation of a memory-based cache directory.

Referring now to FIG. 5, a block diagram of one implementation of a memory-based cache directory 500 is shown. In one implementation, memory-based cache directories 325A-B, 345A-B, and 360A-B (of FIG. 3) include the functionality shown in memory-based cache directory 500. In one implementation, memory-based cache directory 500 includes control unit 505 and array 510. Array 510 includes any number of entries, with the number of entries varying according to the implementation. In one implementation, each entry of array 510 includes at least a state field 515, CPU valid field 520, and tag field 525. It is noted that CPU valid field 520 is also referred to as a node valid field herein. In other implementations, the entries of array 510 include other fields and/or are arranged in other suitable manners.

The state field 515 includes state bits that specify the status (e.g., dirty, shared) of the region. In one implementation, the status is specified to represent the most restrictive cache line state for this particular region. The CPU valid field 520 includes a plurality of bits 530A-N, with one bit for each CPU in the system. Each CPU bit 530A-N represents whether a corresponding CPU has an entry for the region in a CPU-based cache directory. Tag field 525 includes the tag bits that are used to identify the entry associated with a particular region.

By using CPU valid field 520 to track which CPUs have cache lines of a given region, the number of unwanted coherency probes generated while unrolling a region invalidation probe are reduced. As used herein, a "region invalidation probe" is defined as a probe generated by the memory-based cache directory in response to a region entry being evicted from the memory-based cache directory. When a coherent master receives a region invalidation probe, the coherent master invalidates each cache line of the region that is cached by the local CPU.

Figure 6:
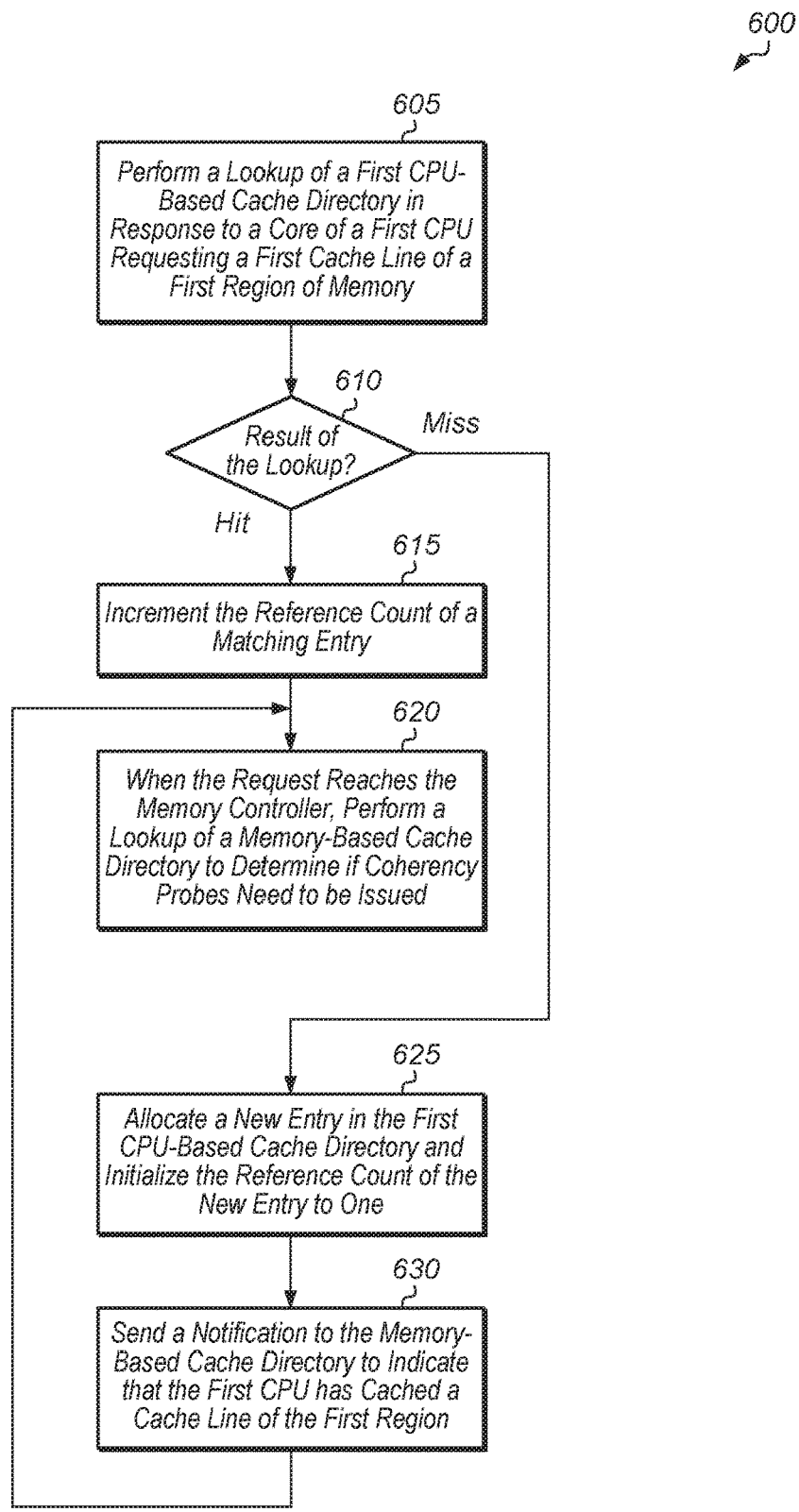
FIG. 6 is a diagram of one implementation of maintaining a dual region-based cache directory which is split between processor and memory.

Turning now to FIG. 6, one implementation of a method 600 for maintaining a dual region-based cache directory which is split between processor and memory is shown. For purposes of discussion, the steps in this implementation and those of FIG. 7-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A lookup is performed of a first CPU-based cache directory in response to one of the cores of a first CPU requesting a first cache line of a first region of memory (block 605). If the lookup of the CPU cache directory is a hit for the first region (conditional block 610, "hit" leg), then the reference count of a matching entry is incremented (block 615). When the request reaches the memory controller, a lookup of a memory-based cache directory is performed to determine if coherency probes need to be issued (block 620). After block 620, method 600 ends. It is noted that the CPU-based cache directory does not send an update to the memory-based cache directory if the lookup of the CPU-based cache directory is a hit for the first region. This helps to reduce the amount of traffic sent on the fabric.

If the lookup of the CPU-based cache directory is a miss for the first region (conditional block 610, "miss" leg), then a new entry is allocated for the first region in the first CPU-based cache directory and the reference count of the new entry is initialized to one (block 625). Also, a notification is sent to the memory-based cache directory to indicate that the first CPU has cached a cache line of the first region (block 630). One example of a memory-based cache directory processing the notification sent in block 630 is described below in the discussion regarding method 700 (of FIG. 7). When the request reaches the memory controller, a lookup of the memory-based cache directory is performed to determine if coherency probes need to be issued (block 620). After block 620, method 600 ends.

Figure 7:
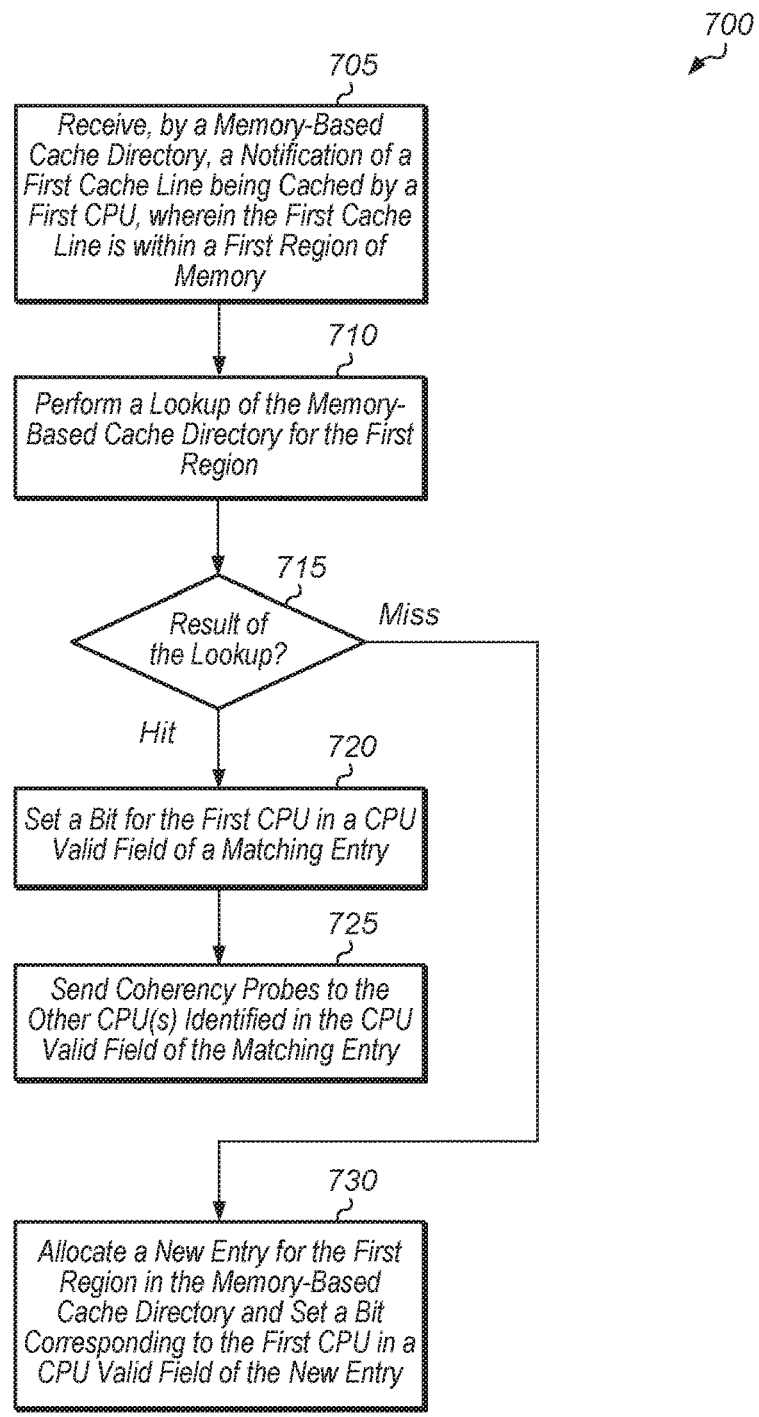
FIG. 7 is a generalized flow diagram illustrating one implementation of a method for memory-based cache directory responding to a new entry allocation notification from a CPU-based cache directory.

Referring now to FIG. 7, one implementation of a method 700 for a memory-based cache directory responding to a new entry allocation notification from a CPU-based cache directory is shown. A memory-based cache directory receives a notification of a first cache line being cached by a first CPU, wherein the first cache line is within a first region of memory (block 705). In response to receiving the notification, a lookup is performed of the memory-based cache directory for the first region (block 710). If the lookup is a hit (conditional block 715, "hit" leg), then the memory-based cache directory sets a bit for the first CPU in a CPU valid field of a matching entry (block 720). Also, the memory-based cache directory sends coherency probes to the other CPU(s) identified in the CPU valid field of the matching entry (block 725). After block 725, method 700 ends.

If the lookup is a miss (conditional block 715, "miss" leg), then a new entry is allocated for the first region in the memory-based cache directory and a bit corresponding to the first CPU is set in a CPU valid field of the new entry (block 730). In one implementation, the memory-based cache directory evicts an existing entry to allocate the new entry if the memory-based cache directory is full. The memory-based cache directory utilizes any suitable eviction algorithm to determine which entry to evict. After block 730, method 700 ends.

Figure 8:
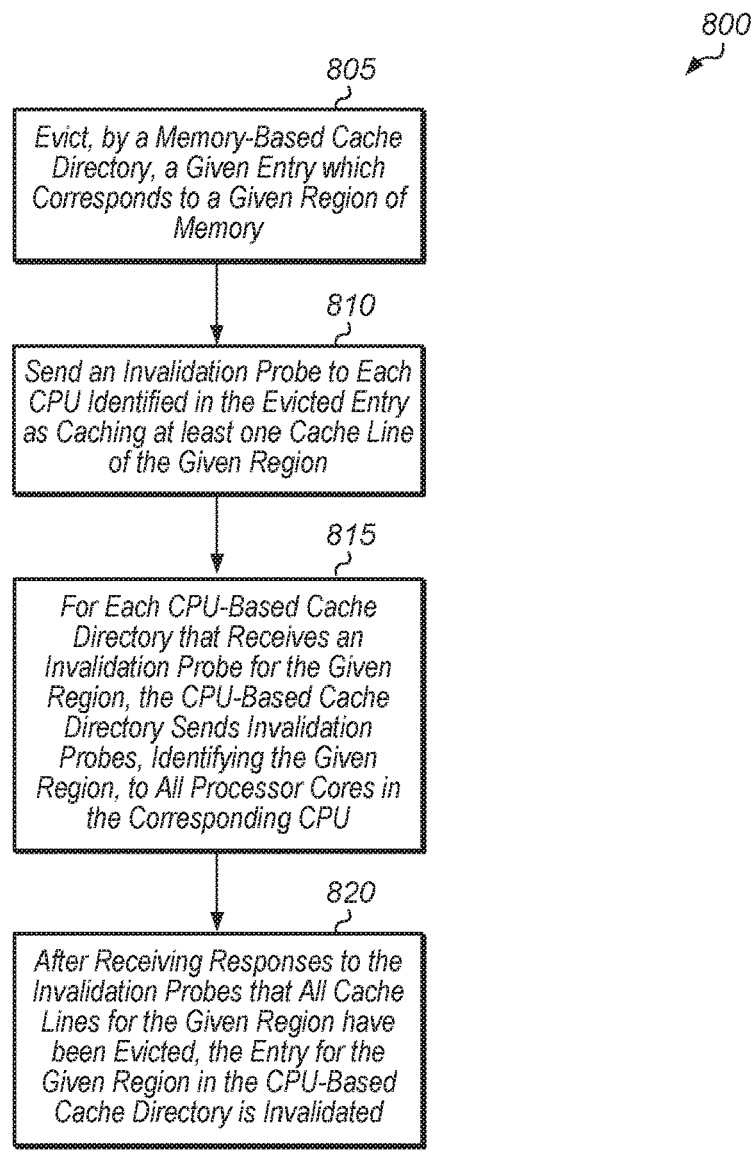
FIG. 8 is a generalized flow diagram illustrating one implementation of a method for a memory-based cache directory processing an eviction.

Turning now to FIG. 8, one implementation of a method 800 for a memory-based cache directory processing an eviction is shown. In one implementation, a memory-based cache directory evicts a given entry, wherein the given entry corresponds to a given region of memory (block 805). Next, the memory-based cache directory sends an invalidation probe to each CPU identified in the evicted entry as caching at least one cache line of the given region (block 810). For each CPU-based cache directory that receives an invalidation probe for the given region, the CPU-based cache directory sends invalidation probes, identifying the given region, to all cores in the given CPU (block 815). After receiving responses to the invalidation probes that all cache lines for the given region have been evicted, the entry for the given region in the CPU-based cache directory is invalidated (block 820). After block 820, method 800 ends.

Figure 9:
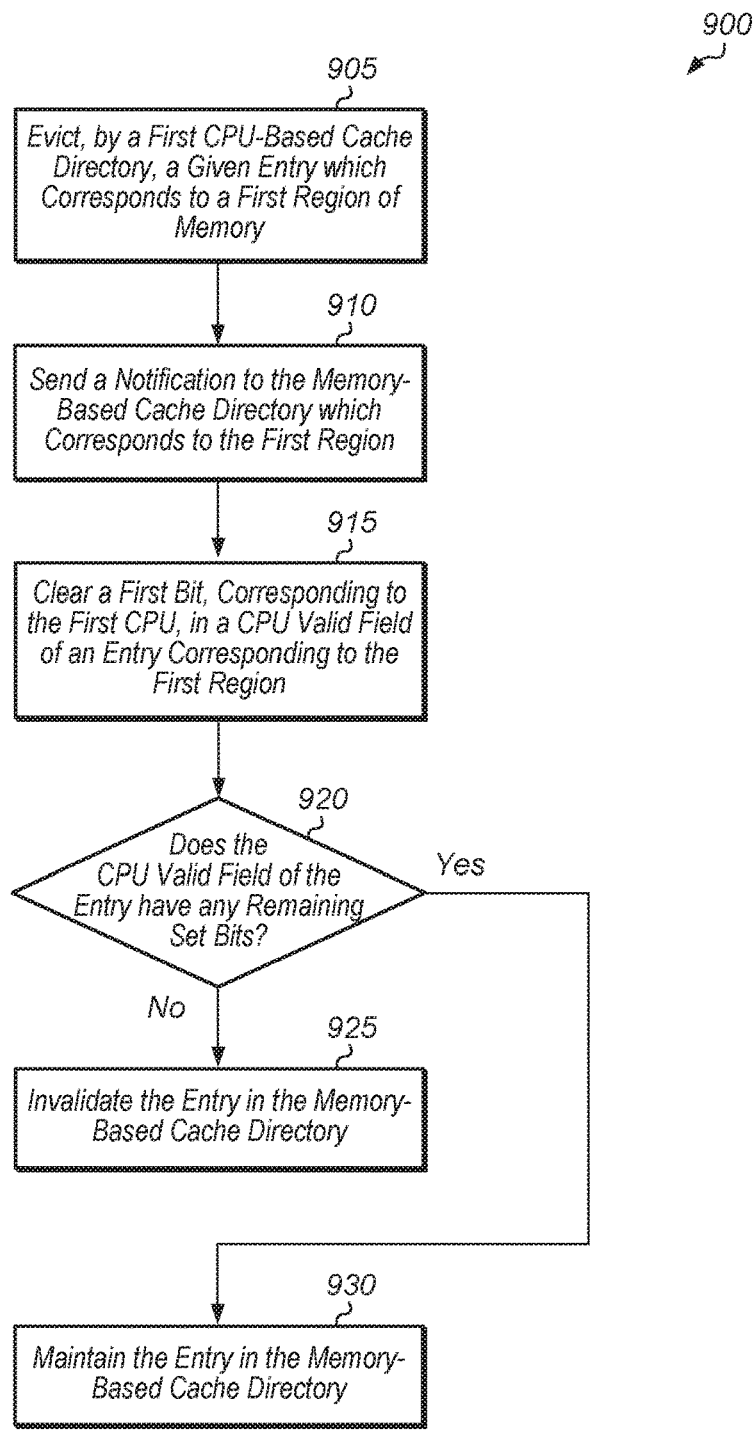
FIG. 9 is a generalized flow diagram illustrating one implementation of a method a CPU-based cache directory processing an eviction.

Referring now to FIG. 9, one implementation of a method 900 for a CPU-based cache directory processing an eviction is shown. A first CPU-based cache directory evicts a given entry, wherein the given entry corresponds to a first region of memory (block 905). It is assumed for the purposes of this discussion that the first CPU-based cache directory tracks, on a region-basis, cache lines that are cached by a first CPU. In response to evicting the given entry, the CPU-based cache directory sends a notification to the memory-based cache directory which corresponds to the first region (block 910). In response to receiving the notification, the memory-based cache directory clears a first bit, corresponding to the first CPU, in a CPU valid field of an entry corresponding to the first region (block 915). Next, if the CPU valid field of the entry no longer has any remaining bits that are set (conditional block 920, "no" leg), then the memory-based cache directory invalidates the entry (block 925). After block 925, method 900 ends. Otherwise, if the CPU valid field of the entry has at least one remaining bit set (conditional block 920, "yes" leg), then the entry is maintained in the memory-based cache directory (block 930). After block 930, method 900 ends.

Figure 10:
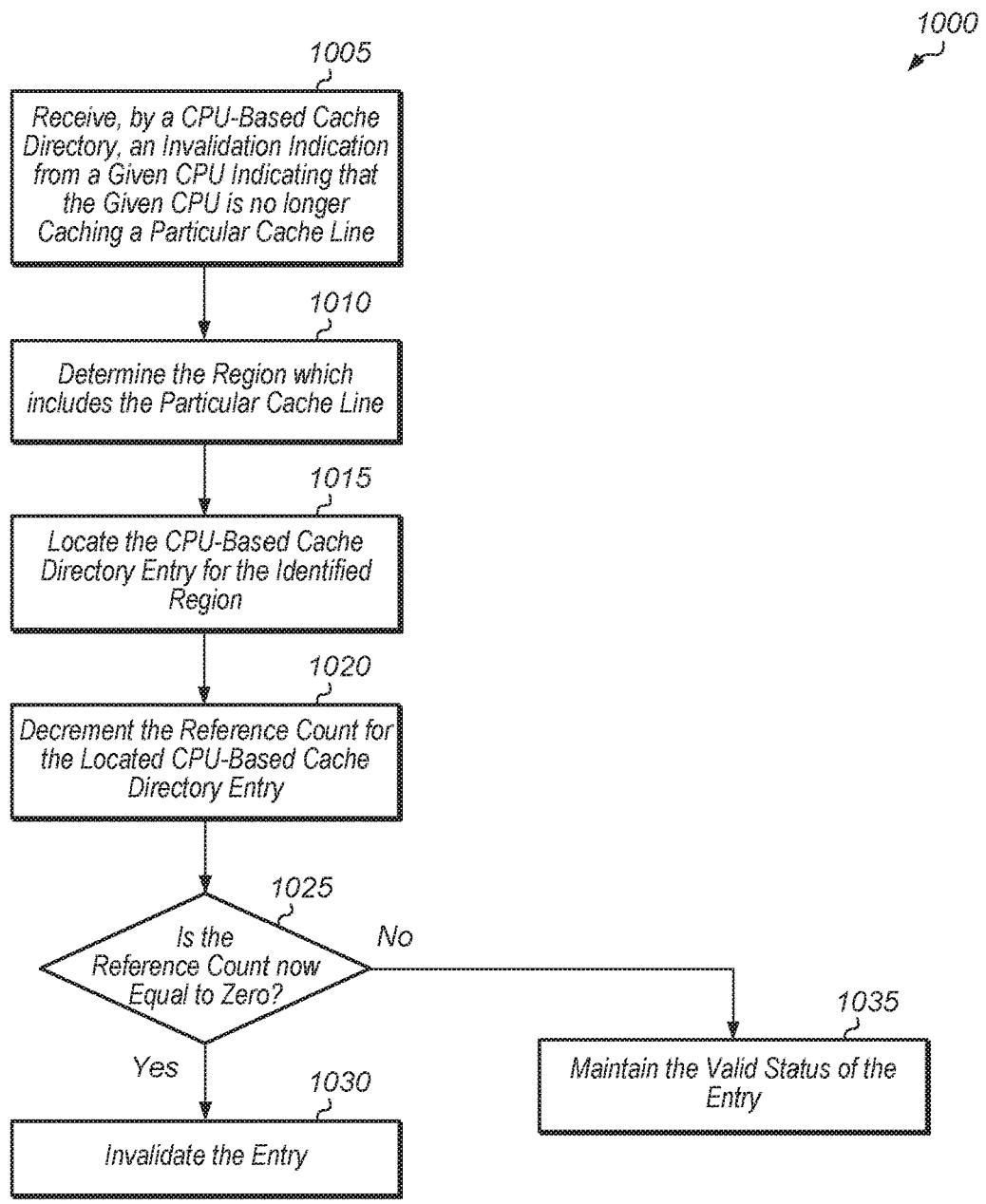
FIG. 10 is a generalized flow diagram illustrating one implementation of a method for a CPU-based cache directory responding to a cache line eviction or invalidation from a local CPU cache.

Turning now to FIG. 10, one implementation of a method 1000 for a CPU-based cache directory responding to a cache line eviction or invalidation from a local CPU cache is shown. A CPU-based cache directory receives an invalidation indication from a given CPU indicating that the given CPU is no longer caching a particular cache line (block 1005). In response to receiving the invalidation indication, the CPU-based cache directory determines the region which includes the particular cache line (block 1010). Next, the CPU-based cache directory locates the cache directory entry for the identified region (block 1015).

Then, the CPU-based cache directory decrements the reference count in the located cache director entry for the identified region (block 1020). If the reference count is now equal to zero (conditional block 1025, "yes" leg), then the CPU-based cache directory invalidates the entry (block 1030). The entry can now be reused to allocate a new entry when a memory request is received targeting a region without a CPU-based cache directory entry. If the reference count is still greater than zero (conditional block 1025, "no" leg), then the CPU-based cache directory maintains the valid status of the entry (block 1035). After blocks 1030 and 1035, method 1000 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a plurality of processing nodes, wherein each processing node comprises one or more processors and a cache subsystem;
 one or more memory devices;
 a plurality of node-based cache directories, wherein each node-based cache directory of the plurality of node-based cache directories corresponds to a given processing node of the plurality of processing nodes, and wherein each node-based cache directory is configured to track which regions of memory have at least one cache line cached in a cache subsystem of the given processing node, wherein a region comprises a plurality of cache lines; and
 one or more memory-based cache directories, wherein each memory-based cache directory of the one or more memory-based cache directories is configured to track which regions of a corresponding memory address range have entries in any of the plurality of node-based cache directories;
 wherein a first memory-based cache directory is configured to:
  maintain an entry for each region of a first memory address range which has an entry in at least one node-based cache directory; and
  invalidate a given entry, corresponding to a given region, responsive to determining that all corresponding entries in the plurality of node-based cache directories have been invalidated.

2. The system as recited in claim 1, wherein each node-based cache directory is configured to:
   maintain an entry for each region of memory which has at least one cache line cached in any cache level of a corresponding processing node; and
   maintain a reference count for each entry, wherein the reference count tracks a number of cache lines of a given region that are cached in any cache level of the corresponding processing node.

3. The system as recited in claim 2, wherein a first node-based cache directory is configured to:
   invalidate a first entry responsive to a reference count of the first entry reaching zero, wherein the first entry corresponds to a first region of the first memory device; and
   send, to a first memory-based cache directory, an indication that the first entry has been invalidated.

4. The system as recited in claim 3, wherein the first memory-based cache directory is further configured to invalidate a second entry, corresponding to the first region, responsive to receiving the indication from the first node-based cache directory that the first entry has been invalidated and responsive to determining that no other node-based cache directory has an entry for the first region.

5. The system as recited in claim 4, wherein the first memory-based cache directory is further configured to:
   maintain a node-valid field for the second entry; and
   clear a bit corresponding to a first node in the node-valid field of the second entry responsive to receiving the indication from the first node-based cache directory that the first entry has been invalidated.

6. The system as recited in claim 5, wherein the first memory-based cache directory is further configured to invalidate the second entry responsive to determining all bits of the node-valid field are cleared.

7. A method comprising:
   maintaining a plurality of node-based cache directories, wherein each node-based cache directory of the plurality of node-based cache directories corresponds to a given processing node of a plurality of processing nodes;
   tracking, by each node-based cache directory, which regions of memory have at least one cache line cached in a cache subsystem of a corresponding processing node, wherein a region comprises a plurality of cache lines;
   maintaining one or more memory-based cache directories;
   tracking, by each memory-based cache directory of the one or more memory-based cache directories, which regions of a corresponding memory address range have entries in any of the plurality of node-based cache directories;
   maintaining, by a first memory-based cache directory, an entry for each region of a first memory address range which has an entry in at least one node-based cache directory; and
   invalidating a given entry, corresponding to a given region, responsive to determining that all corresponding entries in the plurality of node-based cache directories have been invalidated.

8. The method as recited in claim 7, further comprising:
   maintaining, by each node-based cache directory, an entry for each region of memory which has at least one cache line cached in any cache level of a corresponding processing node; and
   maintaining a reference count for each entry, wherein the reference count tracks a number of cache lines of a given region that are cached in any cache level of the corresponding processing node.

9. The method as recited in claim 8, further comprising:
   invalidating, by a first node-based cache directory, a first entry responsive to a reference count of the first entry reaching zero, wherein the first entry corresponds to a first region of the first memory device; and
   sending, to a first memory-based cache directory, an indication that the first entry has been invalidated.

10. The method as recited in claim 9, further comprising invalidating, by the first memory-based cache directory, a second entry, corresponding to the first region, responsive to receiving the indication from the first node-based cache directory that the first entry has been invalidated and responsive to determining that no other node-based cache directory has an entry for the first region.

11. The method as recited in claim 10, further comprising:
    maintaining, by the first memory-based cache directory, a node-valid field for the second entry; and
    clearing a bit corresponding to a first node in the node-valid field of the second entry responsive to receiving the indication from the first node-based cache directory that the first entry has been invalidated.

12. The method as recited in claim 11, further comprising invalidating, by the first memory-based cache directory, the second entry responsive to determining all bits of the node-valid field are cleared.

13. An apparatus comprising:
    a plurality of processing nodes, wherein each processing node comprises one or more processors and a cache subsystem; and
    a plurality of node-based cache directories, wherein each node-based cache directory of the plurality of node-based cache directories corresponds to a given processing node of the plurality of processing nodes, and wherein each node-based cache directory is configured to:
       track which regions of memory have at least one cache line cached in a cache subsystem of the given processing node, wherein a region comprises a plurality of cache lines; and
       maintain a reference count for each entry of the cache directory, wherein the reference count tracks a number of cache lines of a corresponding region that are cached in any cache subsystem.

14. The apparatus as recited in claim 13, wherein a first node-based cache directory is stored in a cache subsystem of a first processing node.

15. The apparatus as recited in claim 13, wherein each node-based cache directory is configured to:
    maintain an entry for each region of memory which has at least one cache line cached in any cache level of a corresponding processing node; and
    maintain a reference count for each entry, wherein the reference count tracks a number of cache lines of a given region that are cached in any cache level of the corresponding processing node.

16. The apparatus as recited in claim 15, wherein a first node-based cache directory is configured to:

invalidate a first entry responsive to a reference count of the first entry reaching zero, wherein the first entry corresponds to a first region of the first memory device; and send, to a first memory-based cache directory, an indication that the first entry has been invalidated.

17. The apparatus as recited in claim 16, wherein the first node-based cache directory is further configured to:

receive, from the first memory-based cache directory, an invalidation probe for a given region;

send invalidation probes, identifying the given region, to all processor cores of a first processing node responsive to receiving the invalidation probe for the given region.

18. The apparatus as recited in claim 17, wherein the first node-based cache directory is further configured to invalidate a second entry for the given region responsive to receiving responses to the invalidation probes that all cache lines for the given region have been evicted.

19. A method comprising:

maintaining a plurality of node-based cache directories, wherein each node-based cache directory of the plurality of node-based cache directories corresponds to a given processing node of a plurality of processing nodes;

tracking, by each node-based cache directory, which regions of memory have at least one cache line cached in a cache subsystem of a corresponding processing node, wherein a region comprises a plurality of cache lines;

maintaining one or more memory-based cache directories;

tracking, by each memory-based cache directory of the one or more memory-based cache directories, which regions of a corresponding memory address range have entries in any of the plurality of node-based cache directories; and maintaining a reference count for each entry of the cache directory, wherein the reference count tracks a number of cache lines of a corresponding region that are cached in any cache subsystem.

* * * * *